June 28, 1966   G. H. MORGAN ET AL   3,258,153
DISPENSING DEVICES WITH AUDIBLE ANNNOUNCING MEANS
Filed Nov. 12, 1964   3 Sheets-Sheet 1

INVENTORS
GEORGE H. MORGAN
RODNEY W. STOUT
BY
Robert J. Schaap
ATTORNEY

June 28, 1966  G. H. MORGAN ET AL  3,258,153
DISPENSING DEVICES WITH AUDIBLE ANNNOUNCING MEANS
Filed Nov. 12, 1964  3 Sheets-Sheet 2
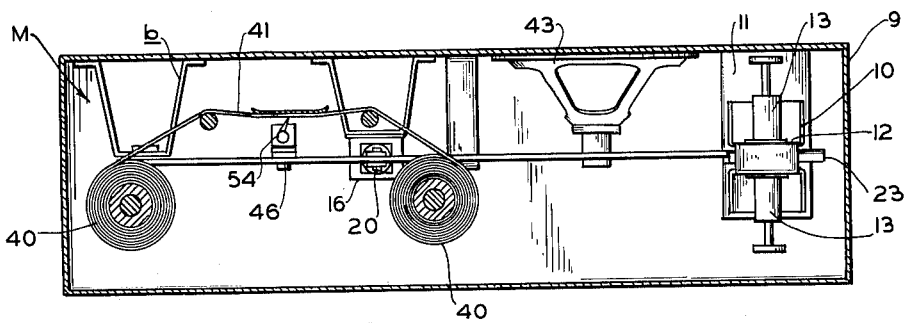
FIG. 3
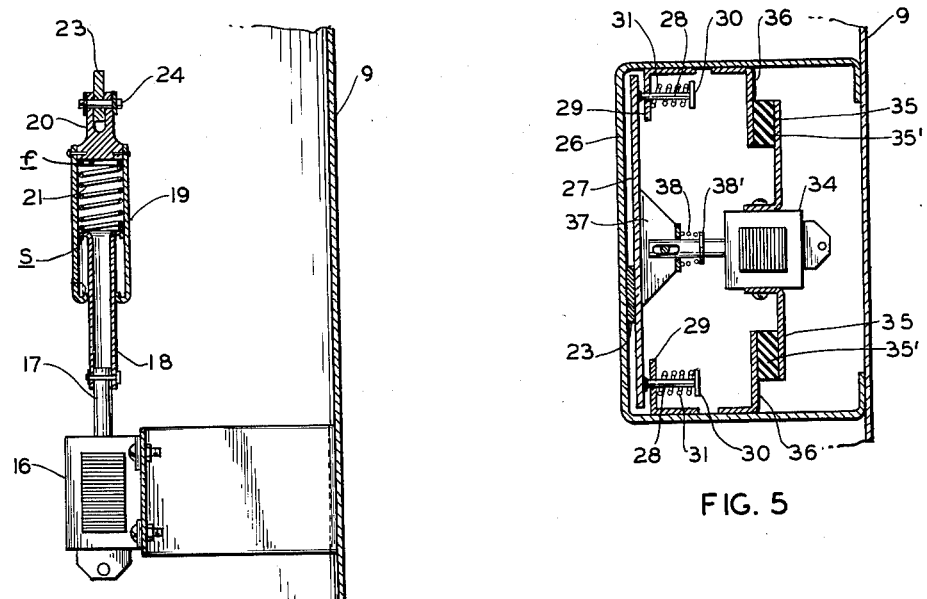
FIG. 6
FIG. 5
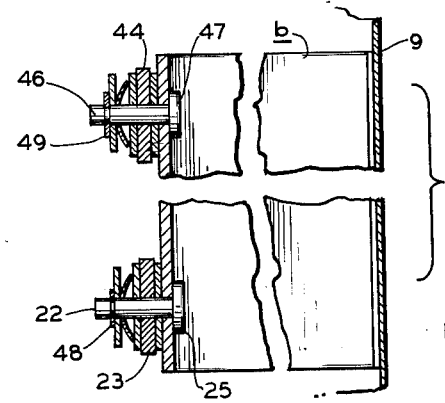
FIG. 7
INVENTORS
GEORGE H. MORGAN
RODNEY W. STOUT
BY
Robert J. Schaap
ATTORNEY United States Patent Office 3,258,153
Patented June 28, 1966

3,258,153
DISPENSING DEVICES WITH AUDIBLE
ANNOUNCING MEANS
George H. Morgan, St. Louis County, Mo. (10163 Carolynne Drive, St. Louis 28, Mo.), and Rodney W. Stout, Webster Grove, Mo.; said Stout assignor to said Morgan
Filed Nov. 12, 1964, Ser. No. 410,383
13 Claims. (Cl. 221—3)

This invention relates in general to certain new and useful improvements in merchandise dispensing devices and more particularly to merchandise dispensing devices with audible announcing means.

Today, it has become a common practice to promote merchandise available to the retail consumer by advertising messages which consist of short songs, poems, ear-catching phrases and so-called "jingles," which the advertising industry designs to attract the attention of the consumer. These various audible announcements, such as the songs and slogans which are associated with particular articles offered for retail sale, are very often mass-advertised by the various communication media such as television and radio. In fact, the public often becomes accustomed to associating a particular song or so-called "jingle" with a particular product. This type of promotional activity is particularly pronounced in the soft drink sales industry and in the tobacco products industry.

It is also a recognized fact that products for promotion, particularly by way of radio and television advertising is very costly and the retailer is therefore constrained to carefully budget his advertising expense. Nevertheless, it is known that gross sales are proportional to the amount of product advertising in connection with many products. Consequently, the retailer or product producer is desirous of obtaining advertising of his product wherever and whenever possible.

Many of the products where sales are directly affected by the amount of promotional activity, such as tobacco products and soft drinks are offered for sale in vending machines. In fact, vending machine sales of cigarette products account for a very large proportion of the total sales of cigarette products of any particular company. However, in all commercially available vending machines, no method is provided for advertising the product dispensed at the time of selection, other than by visual indication of the existence of the product in the machine. Usually, a tab or product label of the particular product in any selected magazine of the vending machine is located in proximity to the mechanism for dispensing that particular vended article. This type of labeling for product label display does not serve any advertising function, but only advises the purchaser of the particular mechanism to actuate in order to obtain the desired product.

It is, therefore, the primary object of the present invention to provide a vending machine with an audible message rendering apparatus which can be actuated by an article dispensing actuator and which is capable of rendering an audible message for each selected vended article.

It is another object of the present invention to provide a vending machine of the type state where the audible message rendering device will select the desired message to be given for each selected vended article.

It is a further object of the present invention to provide a vending machine of the type stated which can be economically manufactured and which will be durable in service.

It is an additional object of the present invention to provide an audible message rendering apparatus for use with conventional vending machines and which is capable of being incorporated into the vending machine so that it will provide a desired audible message upon selection of a desired vended article.

With the above and other objects in view, our invention resides in the novel features of form, construction, arrangement and combination of parts presently described and pointed out in the claims.

In the accompanying drawings (3 Sheets):

FIGURE 3 is a horizontal sectional view taken along line 3—3 of FIGURE 2 showing components of the audible message rendering apparatus of the present invention;

Figure 2:
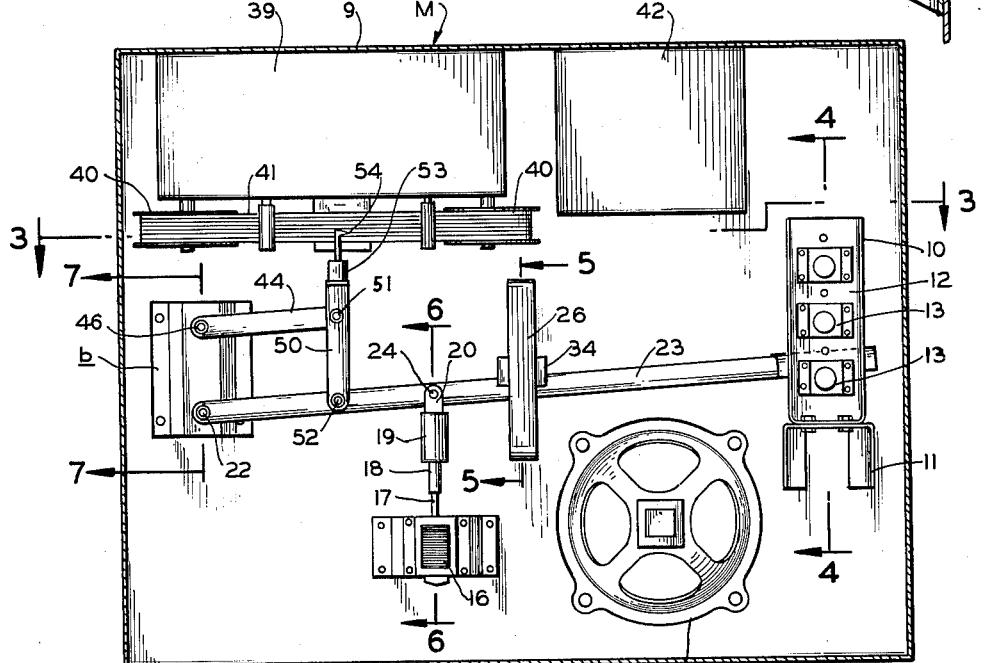
FIGURE 2 is a fragmentary vertical sectional view taken along line 2—2 of FIGURE 1 and showing the audible message rendering apparatus of the present invention.
Figure 8:
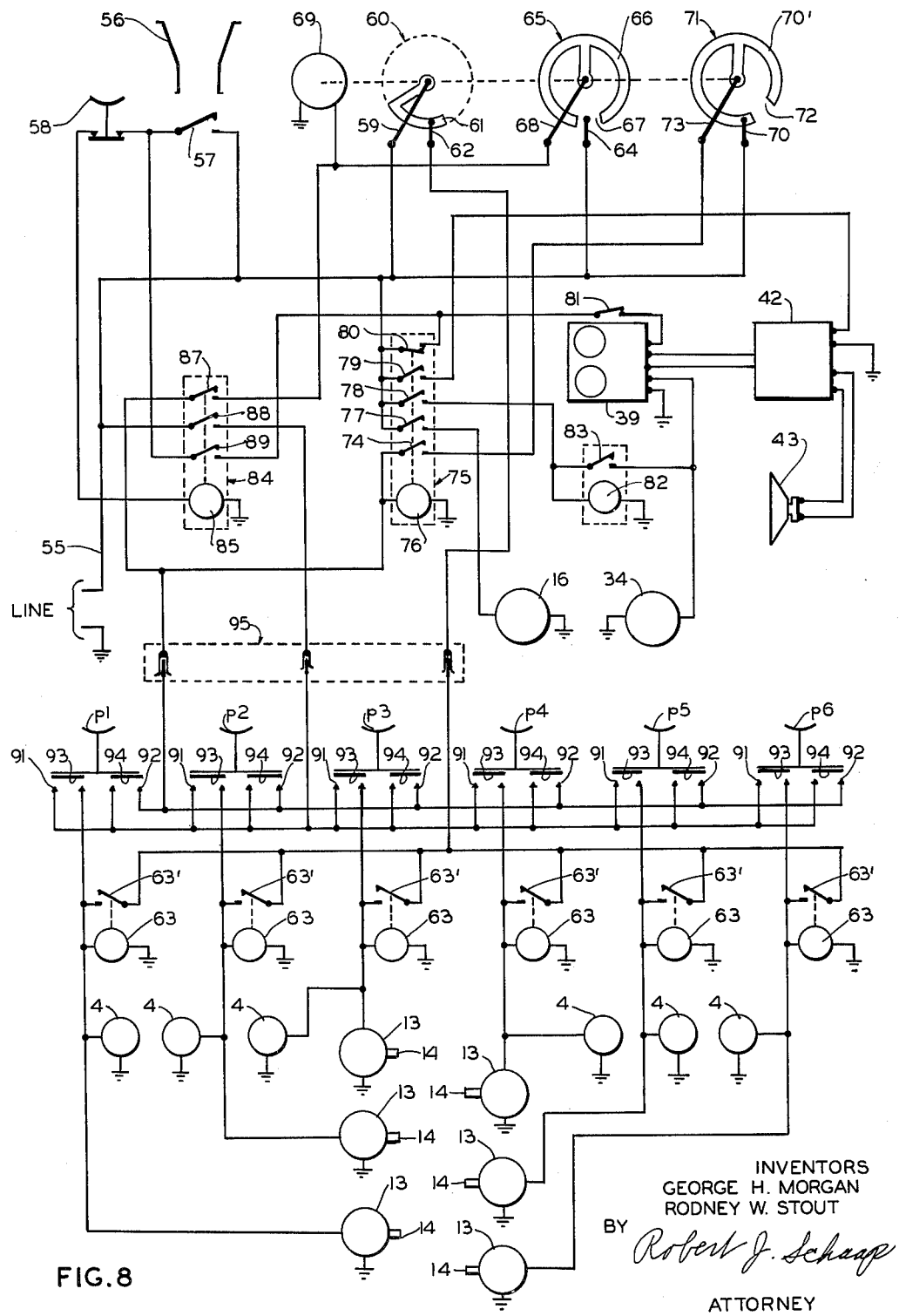

FIGURES 4, 5, 6 and 7 are fragmentary sectional views taken along lines 3—3, 4—4, 5—5, 6—6 and 7—7 respectively of FIGURE 2; and FIGURE 8 is a schematic view showing the electrical circuitry forming part of the vending machine of the present invention.

*General description*

Generally described, without restriction on the scope of our invention as defined in the appended claims, the present invention relates to a vending machine with a built-in apparatus for providing an audible message upon the selection of a vended article. The apparatus for providing the audible messages is also capable of being incorporated into presently existing and conventional vending machines by simple alteration of the mechanical structure and electrical circuitry thereof. The apparatus of the present invention is capable of being employed in vending machines which dispense a multiplicity of different items including selections of so-called "'soft goods" such as bags of potato chips, snack foods, handkerchiefs and the like or so-called "hard goods" such as candy bars and the like. Moreover, the apparatus of the present invention is capable of being employed in vending machines which are designed to dispense liquid beverages.

The vending machine of the present invention includes a conventional coin acceptor and actuator which is capable of energizing a circuit to release the vended article upon the receipt of a proper amount of money. When a sufficient amount of money has been deposited in the coin acceptor, the actuator closes a circuit to a relay and completion of the circuit will energize a plurality of selector buttons or pull-rods for obtaining a desired vended article. By pressing a desired pushbutton, a circuit to a dispensing solenoid is completed opening the closure in the magazine of that particular article permitting the article to travel to a receiving compartment where it may be removed by the purchaser. In the case of the vending machine dispensing beverages, closing of the pushbutton switch will complete a circuit to a solenoid permitting dispensing of the selected liquid beverage.

The closing of the pushbutton switch will also complete a circuit to a positioning solenoid which is designed to engage an indexing arm. The indexing arm is spring biased to shift until it is engaged by a pin of the indexing solenoid. A timing mechanism permits the indexing arm sufficient time to move to the desired index position where a circuit to a second relay is completed. Completion of this circuit will energize a clamping solenoid permitting a pair of clamping plates to engage the indexing arm and lock the same in its indexed position. The indexing arm carries a phonograph pick-up arm which is designed to move transversely across a multitrack tape to the correct message channel. The tape of the present invention is suitably designed for use in a conventional transistorized tape recorder and is designed to contain a message for each selected vended article. Thus, each of the positioning solenoids are so located so that the phonograph pick-up arm will be positioned at the proper tape channel pursuant to actuation of the desired pushbutton. As the indexing arm is moving to the desired position, a circuit is completed to a tape recorder and a phonograph speaker for energizing or warming-up the components thereof. As soon as the indexing arm is locked in its indexed position, the tape recorder will initiate rotation of the tape where the pick-up arm will produce the message on the particular tape channel over which it is positioned.

A second timer is provided for timing the audible messages on each of the channels and will break the circuit to the second relay after a predetermined time interval after the prescribed message is completed. A third timer is provided for allowance of sufficient time for the indexing arm to move back to its original position and to allow the tape recorder to reverse the phonograph tape so that the vending machine is prepared for a new cycle upon actuation thereof. A synchronous timing motor is provided for actuating each of the aforementioned timers.

*Detailed description*

Figure 1:
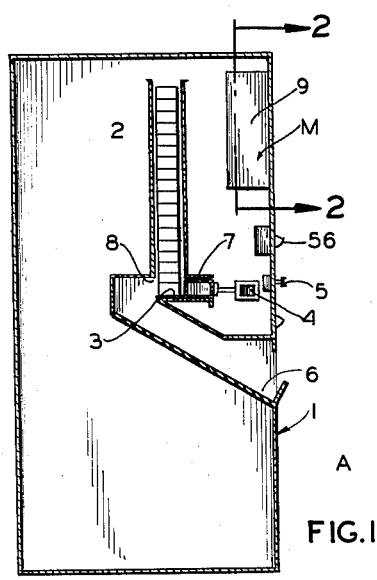
FIGURE 1 is a schematic side elevational view of a vending machine constructed in accordance with and embodying the present invention.

Referring now in more detail and by reference characters to the drawings which illustrate a preferred embodiment of the present invention, A designates a vending machine comprising an outer housing 1, substantially as shown in FIGURE 1. As heretofore mentioned, the present invention is primarily concerned with the audible announcing means to be used in a vending machine and is only incidentally concerned with that portion of the vending machine which receives the coin, inspects the same and releases the operating mechanism. Accordingly, the present invention does not provide any specific type of coin accepting mechanism or coin operating mechanism. It is only required that the vending machine of the present invention include some shifting member which is operated for a limited distance to cause the transference of power to an article dispensing mechanism. Typical article dispensing mechanisms which can be used in the present invention are illustrated in United States Letters Patents 3,140,798 and 3,144,170. However, it should be understood that any one of many conventional coin receiving and actuating mechanisms presently known in the vending art can be incorporated in the vending machine of the present invention.

For the purposes of the present invention, it may be assumed that the vending machine A includes a plurality of magazines 2, each of which are designed to dispense different brands or qualities of merchandise in succession. Each of the articles in the magazines 2 is retained by means of a closure plate or article supporting plate 3, which is shiftable into and out of closurewise position. The shifting of the closure plate 3 is accomplished by means of a solenoid 4 which is in turn energizable by actuation of a desired actuator 5, which as previously described is conventional in its construction. For the purposes of the present invention, the vending machine A is illustrated as having 6 separate and distinct magazines each containing separate vendable articles. The actuators 5 associated with each of the compartments 2 are operable by pushbutton switches $p_1$, $p_2$, $p_3$, $p_4$, $p_5$, and $p_6$. Therefore, if it is desired to obtain an article in a particular magazine associated with the pushbutton switch $p_2$, the purchaser pushes the pushbutton switch $p_2$ for actuation of the actuator 5 which in turn energizes the solenoid 4 and allows the closure plate 3 to move out of its closurewise position. As this occurs, the closure plate 3, which also serves as a tray, will dump the vendable article into a discharge chute 6 as it moves in a rearward direction, reference being made to FIGURE 1. It is to be noted that a retainer block 7 prevents any additional article in the particular magazine 2 from dropping onto the closure late 3 while the latter is in its extended position. Thereafter, as the closure plate 3 is moved to its closurewise position, the next succeeding article will be deposited thereon for ultimate discharge upon proper actuation of the actuator 4. The discharge chute 6 is, of course, provided with a discharge aperture 8 through which the purchaser can remove the selected article.

Figure 4:
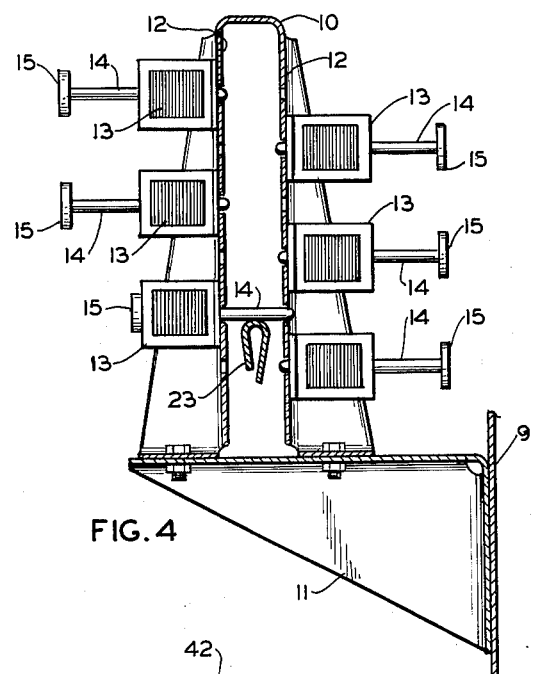

The audible message rendering apparatus M can be suitably enclosed within a relatively small housing or container 9 and offered as a compact unit. It is also mounted internally of the housing 1 in any convenient location with sufficient area for accommodating the apparatus M, substantially as shown in FIGURE 1. The container 9 can be provided with any suitable fastening means such as bolts for convenient securement to the housing 1. The means for fastening is conventional and is therefore neither illustrated nor described in detail herein. The construction of the audible message rendering apparatus M is more specifically illustrated in FIGURE 2 and comprises a U-shaped bracket 10 which is secured to a supporting bracket 11, the latter in turn being bolted or otherwise rigidly secured to the back wall of the housing 9. The bracket 10 includes a pair of spaced parallel vertically extending legs 12 upon which are rigidly mounted a plurality of vertically spaced indexing solenoids 13. In this connection, it should be observed that there is one indexing solenoid 13 for each separate compartment 2 or a total of six indexing solenoids. Each of the indexing solenoids 13 includes a shiftable index pin 14 which is capable of being shifted into and out of an indexing position by energization and de-energization of its respective solenoid 13. Accordingly, the pin 14 would serve as the core of the solenoid 13 and would be formed of a ferromagnetic material. Each of the pins 14 includes an outer head 15 and when the pin 14 is shifted to the indexing position, upon energization of the solenoid 13, the head 15 would be moved into facewise engagement with the outer surface of the solenoid 13, substantially as shown in FIGURE 4.

Also suitably mounted within the housing 9 is a positioning solenoid 16 having a shiftable ferromagnetic plunger 17. Rigidly secured to a protruding end of the plunger 17 is a non-magnetic arm 18 which is disposed within a retaining cylinder 19 and rigidly secured to the outer end thereof is a clevis forming pivot head 20 substantially as shown in FIGURE 6. The upper end of the arm 18 is curled outwardly in the form of a shoulder $s$ and the upper end of the cylinder 19 presents an interior face $f$ and interposed therebetween is a spring 21, which biases the plunger 17 to its de-energized position inwardly of the solenoid 16.

Rigidly mounted on the back wall of the housing 9 is a bracket $b$ and pivotally secured thereto by means of a pivot pin 22 is a relatively long indexing arm 23 which is movable by means of a pivot pin 24 which pivotally secures the pivot head 20 to the arm 23. The pivot pin 22 may be of any conventional type, and may be provided with a threaded end (not shown) which is secured to the back wall of the housing 9. Moreover, the pivot pin 22 is provided with an enlarged head 25. The indexing arm 23 extends between each of the legs 12, substantially as shown in FIGURES 2 and 4 and is shiftable therebetween, so as to be engageable by one of the pins 14 when the latter is extended to its indexing position.

By reference to FIGURE 3, it can be seen that the indexing arm 23 shifts between a pair of clamping plates 26, 27, the clamping plate 26 being formed with the front plate of the housing 9. The clamping plate 27 is shiftable into and out of engagement with the indexing arm 23 on a pair of guide pins 28 which are secured to the clamping plate 27. The guide pins 28 are further retained by L-shaped brackets 29 mounted internally on the upper and lower walls of the housing 9. The guide pins 28 are provided with enlarged heads 30 for retaining compression springs 31 which also bear against the L-shaped brackets 29, the latter in turn being secured to the clamping plate 27, so that the plate 27 is biased out of engagement with the indexing arm 23. Thus, it can be seen that the indexing arm 23 is freely shiftable between the clamping plates 26, 27 as they are in effect biased out of engagement by the compression springs 31. The compression springs 31 are maintained in their biasing position and in alignment since they are circumferentially disposed about the guide pins 28, substantially as shown in FIGURE 5. The clamping plate 27 is capable of being biased into clamping engagement so that it holds the indexing arm 23 in a rigid position, in the manner as shown in FIGURE 3, by means of a clamping solenoid 34. The solenoid 34 is provided with L-shaped brackets 35 which are provided with foam rubber pads 35' at their outer ends. The pads 35' are secured to brackets 36 mounted on the interior upper and lower walls of the housing 9. In this manner, the solenoid 34 is protected against strong vibrations. The clamping solenoid 34 normally includes a plunger which is provided at its outer end with a fitting 37 which is secured to the clamping plate 27 in the manner as shown in FIGURE 5. The clamping plate 27 is biased into engagement with the indexing arm 23, against the action of the spring 31 by means of a spring 38 which is interposed between opposed shoulders 38' on the fitting 37 and the plunger of the solenoid 34. By means of the above construction, it can be seen that the plate 27 is biased out of engagement with the arm 23 and moreover the coaction of the springs 31 and 38 will prevent vibration of the solenoid 34 from affecting the clamping action of the indexing arm 23. The mechanism for energizing the solenoid 16 and the solenoid 34 which actuates the indexing arm 23 and the clamping plates 26, 27 respectively, is more fully illustrated in FIGURE 6 and is more fully described in detail hereinbelow.

Also suitably mounted in the housing 9 is a tape recorder 39 which is preferably of a compact nature and transistorized so that the amplifier thereof has a low RC factor. The tape recorder 39 also conventionally includes a pair of rotating spools 40 and trained therearound is a multitrack or so-called "multichannel" tape 41. In this connection, the tape 41 is designed to have a number of channels which is equal to the number of magazines 2 in the vending machine A. Therefore for the purpose of illustrating the present invention, the tape 41 is designed to have 6 channels, one for each magazine 2. Also suitably mounted within the housing 9 is a phonograph transcriber and amplifier 42 which is electrically connected to the tape recorder 39 and which is also connected to a conventional speaker 43. The speaker 43 is suitably mounted within the housing 9 in any convenient position, so that audible messages from the audible message rendering device M can be received by the purchaser of the vended article. It should also be understood that the tape recorder 39, the phonograph 42 and the speaker 43 are all conventional in their construction and therefore are neither illustrated nor described in detail herein.

The indexing arm 23 is retained in vertical alignment between the legs 12 of the U-shaped bracket 10 and is prevented from vibrating by means of operative connection to a reinforcing arm 44. The pivoted end of the indexing arm 23 is maintained in alignment with the pivoted end of the reinforcing arm 44 by means of a pivot pin 46, which pivotally secures one end of the arm 44 to the bracket $b$. In this connection, it should be understood that the pivot pin 46 is also provided with an enlarge head 47 in the manner that the pivot pin 22 is provided with an enlarged head 25. The indexing arm 23 and reinforcing arm 44 are maintained in pivotal securement to the bracket $b$ by the heads 25, 47 and washers and lock rings 48, 49 on the pins 22, 46, respectively, substantially as shown in FIGURE 7. The opposite end of the reinforcing arm 44 is pivotally connected to a phonograph pick-up arm 50 through a pivot pin 51, the outer end of the pick-up arm 50 being pivotally secured to the indexing arm 23 by means of a pivot pin 52. It should be understood that the phonograph pick-up arm 50 forms part of the phonograph 42 and includes a conventional cartridge 53 and a needle 54, the latter being adapted to move across any of the selected channels on the tape 41 for reproducing the sound track of that selected channel. By means of the above outlined construction, it can be seen that the indexing arm 23 will shift upon actuation of the solenoid 16 and moreover will shift between the various indexing solenoids 13 until it is engaged by the proper indexing pin 14. At this point, the clamping solenoid 34 will be energized for holding the indexing arm 23 in its indexed position. At this particular position, the needle 54 will be positioned on the proper channel of the phonograph tape 41 which will be actuated in a manner hereinafter described in detail.

*Electrical circuitry*

The electrical circuitry and electrical components thereof for operating the audible message rendering device M are more fully illustrated in FIGURE 8. As previously described, the components including part of this electrical circuitry are the positioning solenoid 16, the clamping solenoid 34, the tape recorder 39, the photograph 42 and the speaker 43. Also illsutrated in FIGURE 8 as components forming part of the electrical circuitry is the delivery solenoid 4, which is, in general, conventionally part of a conventional vending machine. Moreover, included as a component of the electrical circuitry is the indexing solenoid 13. Each of these components is schematically illustrated in FIGURE 8.

The circuit illustrated in FIGURE 8 is operatively connected to a source of electrical current (not shown) and includes a power line 55 which is connected to a conventional coin acceptor and actuator 56, as schematically illustrated in FIGURE 8. The coin acceptor and actuator 56 conventionally includes a microswitch 57, which is normally open and adapted to close upon receipt of the proper amount of money in order to actuate the delivery solenoid 4. The vending machine A also includes a reject pushbutton switch 58 which is suitably positioned on the exterior panel of the housing 1 so that the purchaser can remove his coin before making the proper selection, if desired. The power line 55 is also connected to the contact arm 59 of an indexing timer 60. The indexing timer 60 is designed with a relatively short rotatable contact plate 61 having a terminal 62, which is connected directly to holding solenoids 63 each of which are provided with normally open holding contacts 63'. In this connection, it can be observed that there are six holding solenoids 63 and six holding contacts 63'.

The power line 55 is also electrically connected to a terminal 64 forming part of a resetting timer 65. By reference to FIGURE 8, it can be seen that the timer 65 includes a relatively long arcuately shaped rotatable contact strip 66 which is slightly less than 360° in length and includes an air gap 67. However, it can be seen that the terminal 64 is positioned in the air gap 67 for reasons which will presently more fully appear. The timer 65 includes a contact arm 68 which is connected to the rotatable contact strip 66, and has one terminal connected to a synchronous timer motor 69 which provides the timing speed for the resetting timer 65.

The power line 55 is also connected to terminal 70 of a rotatable arcuate contact strip 70' of an audible message timer 71. Again by reference to FIGURE 8, it can be seen that the message timer 71 has an air gap 72 between the terminal ends of the arcuate contact strip 70'. Moreover, it can be seen that the air gap 72 is slightly offset with respect to the air gap 67 of the resetting time 65, all for reasons which will presently more fully appear. The audible message timer 71 includes a contact arm 73 which is in turn connected to normally open holding contacts 74 of a relay 75. While the various timers 60, 65, 71 and the timer motor 69 are schematically illustrated in FIGURE 8 without structural attachment, it should be understood that these various components are suitably mounted within the housing 9. Moreover, the mechanism of operating each of the timers is conventional and is therefore neither illustrated nor described in detail herein.

The relay 75 includes a relay solenoid 76 which is designed to operate a set of normally open contacts 77, a set of normally open contacts 78, at set of normally open contacts 79 and a set of normally closed reversing contacts 80. The reversing contacts 80 are also electrically connected to a set of reversing contacts 81 which are electrically connected to the tape recorder 39 in the manner as shown in FIGURE 8. The normally open contacts 78 are electrically connected to a time delay relay 82, which is electrically connected to and operable by a holding contact 83, for reasons which will more fully appear.

Also included within the circuitry of the present invention is a relay 84 which includes a relay coil 85 and a set of normally open contacts 87 which are connected to the timer motor 69 and the contact arm 68 of the resetting timer 65. The relay 84 also includes a set of normally open contacts 88 and a set of normally open contacts 89, the latter being connected to the reversing contacts 81 and to the coin acceptor and actuator 56. The contacts 88 are connected to the power line 55 and electrically connected to each of the pushbutton switches $p_1$, $p_2$, $p_3$, $p_4$, $p_5$, and $p_6$. By further reference to FIGURE 8, it can be seen that each of the pushbutton switches $p_1$, $p_2$, $p_3$, $p_4$, $p_5$, and $p_6$ contains pairs of normally open contacts 91, 92 which are closed by contact plates 93, 94 respectively upon actuation of each of the pushbutton switches $p$. It should be understood that each of the relays 75 and 84 and the time delay relay 82 are also mounted within the housing 9. Moreover, each of the electrical components, while they are schematically illustrated in the manner as shown in FIGURE 8, are all mounted in compact units and can be easily and conveniently mounted within housing 9 so that the audible message rendering apparatus M can be manufactured in a relatively small compact unit. In fact, the audible message rendering device M can be conveniently provided with a connector strip 95 having a series of contacts for contact to the plug of a conventional vending machine.

*Operation*

As previously mentioned, the audible message rendering device M can be conveniently incorporated with a vending machine A, or can be offered as a compact unit to be installed in an existing conventional vending machine. In this latter embodiment, a simple modification of the electrical circuit of the existing vending machine would provide a means for connection to the connector strip 95. Naturally, if the audible message rendering device M were to be incorporated in a newly designed machine, the connector strip 95 could be removed, or eliminated from use. The electrical circuitry as described in FIGURE 8 is, of course, connected to a suitable source of alternating electrical power, preferably 120 volt alternating current. At this point, it should be understood that the remainder of the mechanical structure of the conventional vending machine is not described. Again, for the details of operation of conventional vending machines, reference is made to any of United States Letters Patent Nos. 3,140,978, 3,144,170, and 3,144,959. Each of the magazines 2 are then loaded in a proper manner with the desired merchandise so that the vending machine A is ready for use.

When the purchaser desires to purchase a particular vended article, the purchaser will deposit his money in the coin receiver and actuator 56. This device, which as previously described is conventional, will analyze the deposit of money to determine the proper amount, and upon analysis thereof, will close the contacts 57 if the purchaser has deposited the proper amount of money. As the contacts 57 are closed, a circuit is completed to the relay 84 energizing the relay coil 85. Energization of this coil 85 will cause each of the normally open contacts 87, 88, and 89 to close. Closing of the contacts 87 will complete a circuit to one of the contacts forming part of the set of contacts 92 on each of the pushbutton switches $p$. Moreover, closing of the contacts 87 will complete a circuit to the timer motor 69 causing the same to start its synchronous time movement upon closing of any of the pushbutton switches $p$. The closing of the contact 88 will complete a circuit to one of the contacts forming part of the set of contacts 91 on each of the switches $p$. Finally the closing of contacts 89 will hold the coil 85 of the relay 84 in the energized state.

At this point, the purchaser is ready to make his selection by closing any of the pushbutton switches $p_1$, $p_2$, $p_3$, $p_4$, $p_5$, or $p_6$. However, if after depositing his money he thereafter decides that he does not wish to make a selection of any of the merchandise in any magazine 2, he may release his money from the coin acceptor 56 by pressing the reject switch 58. The mechanism for releasing the money from the coin acceptor 56 is conventional and is therefore neither illustrated nor described in detail herein. However, for the purposes of the present invention, the opening of the normally closed reject switch 58 does break the circuit to the relay 85 which was previously energized.

If the purchaser now desires to make a selection of any of the merchandise in any of the magazines 2, he can press the proper pushbutton switch $p$ associated with that particular magazine. Assuming for purposes of illustration, that the purchaser decides to select merchandise in the second magazine, he would push the pushbutton switch $p_2$ thereby completing the circuit between the set of normally open contacts 91 by means of the contact plate 93 and would complete a circuit between the set of normally open contacts 92 by means of the contact plate 94. The closing of the pushbutton switch $p_2$ will also complete a circuit to the delivery solenoid 4 which will permit the actuator 7 to shift the closure plate so that the merchandise in the magazine is removed from its stacked position. The particular piece of merchandise is carried on the closure plate 3 in the manner as previously described and dropped into the discharge chute 6 when the closure plate 3 shifts back to its closurewise position. Again, as previously indicated, the next succeeding piece of merchandise in the magazine 2 will then be deposited upon the closure plate 3.

Closing of the switch $p_2$ will also close the holding solenoid 63 which will in turn close the holding contacts 63' and the holding contact 63' will maintain energization of the solenoid 63, even when the pushbutton switch $p_2$ is released. Closing of the switch $p_2$ will also complete a circuit between the contacts 92 thereby causing energization of the timer motor 69, and energization of the resetting timer 65 causing the contact strip 66 to rotate. Moreover, a circuit will be completed through the now closed cotnacts 74 to the audible message timer 71 causing the contact strip 70' to rotate. As the contacts 77 are now closed by energization of the relay solenoid 76, a circuit is completed to the positioning solenoid 16. Energization of the solenoid 16 will extend the solenoid plunger 17 and the arm 19 to extend shifting the indexing arm 23 upwardly in the bracket 10, reference being made to FIGURES 2 and 4. At this point, it should be noted that the circuit to the clamping solenoid 34 has not yet been completed since the switch 83 still remains in the open position by action of the time delay relay 82. Therefore, the indexing arm 23 can move freely within the legs 12 of the bracket 10. The closing of the pushbutton switch $p_2$, however, does complete a circuit to the proper indexing solenoid 13 causing energization of the latter and inward extension of the indexing pin 14. One of such index pins is shown in the indexing position in FIGURE 4. The indexing arm 23 will shift until it strikes the indexing pin 14 and will be held in that position. The contact strip 61 of the indexing timer 69 provides sufficient time for the indexing arm 23 to move to its indexing position until it is engaged by the proper indexing pin 14. For this purpose, the contact plate 61 is designed with sufficient length to provide the sufficient time interval for the indexing operation. After the movable arm 59 passes the contact plate 61, the circuit to the holding solenoid 63 will be broken and simultaneously therewith the time delay relay 82 will be energized. In this connection, the time delay relay 82 is designed to become energized at a time interval which is approximately equal to the time that the contact strip 61 moves along the terminal 62. Energization of the time delay relay 82 will close the contacts 83 thereby closing a circuit to the clamping solenoid 34. As this occurs, the clamping solenoid will extend the arm 36 causing the clamping plate 27 to engage the indexing arm 23 between the clamping plates 26, 27 and thereby hold the indexing arm 23 in a rigid position.

Moreover, it can be seen that as the movable contact strip 61 passes the terminal 62, a circuit to the indexing solenoid 16 will be broken, causing de-energization thereof. However, the clamping solenoid 34 will remain energized holding the indexing arm 23 in the clamped position.

It should be noted that the indexing arm 23 is held in a fairly rigid position during its shifting movement within the bracket 10 by means of the reinforcing arm 44. As the indexing arm 23 is locked in the proper indexed position, the needle 54 of the phonograph pick-up arm 50 will be positioned over the proper channel on the tape 41. Simultaneously with the energization of the clamping solenoid 34, a circuit to the tape recorder 39 is completed causing rotation of the reels 40 and movement of the tape 41. As the pick-up needle 54 is in the proper channel, the pick-up arm 50 will pick up the proper message from the tape 41 and transmit the same to the phonograph 42 which in turn transmits the audible message to the speaker 43. In this case, for example, if the purchaser selects a particular piece of merchandise, he will hear an advertising message which is associated with that particular piece of merchandise. As previously indicated, many consumers relate particular messages, jingles, and songs to merchandise by constant radio and television advertising thereof. The purchaser will thereupon hear the jingle or song or message that he normally associates with the product of his choice.

It should be understood that each of the messages is designed so that they will not exceed the length of time which is required by the contact strip 70' to move along the terminal 70 of the audible message timer 71. However, the message circuit will be maintained in an energized state until the air gap 72 reaches the terminal 70 thereby breaking the circuit to the tape recorder 39, and the phonograph 42. A circuit is also completed to the resetting timer 65 causing the contact strip 66 to move along the terminal 64. It should also be noted that while the audible message timer 65 is actuated, the contact strip 73 is also moving and as the air gap 72 reaches the terminal 70 a circuit to the holding contact 74 of the relay 76 is broken, thereby de-energizing the relay 75. As this occurs, clamping solenoid 74 is de-energized permitting the spring 21 to shift the indexing arm 23 back to its orignal position. It can also be seen that the reversing contacts 81 will close as will the normally closed contacts 80 and the relay 76. This will permit the tape 41 to reverse its position on the spools 40 for the next selection. The resetting timer 65 will continue for a short time after the air gap 72 has reached the terminal 70 permitting the resetting of the tape recorder 39 and the resetting of the indexing arm 23. This will also permit the relay 75 to be actuated upon another selection. Thereafter, as the air gap 67 reaches the terminal 64, the timer motor 69 is de-energized. At this point all components of the audible message rendering device M have been repositioned and the vending machine A is capable of being actuated for another selection.

In connection with the present invention, it has been illustrated that the vending machine A is provided with six compartments and six pushbutton switches $p_1$, $p_2$, $p_3$, $p_4$, $p_5$, and $p_6$. However, it should be understood that the vending machine A can be provided with any number of desired compartments or magazines 2. Naturally, a separate actuating switch $p$ will be provided with each magazine. Moreover, an individual indexing solenoid 13 will also be provided for each magazine. It should also be understood that it is not necessary to employ pushbutton switches such as the type illustrated and that any suitable actuating mechanism such as levers can be employed.

It should be understood that changes and modifications in the form, construction, arrangement and combination of parts presently described and pointed out in the claims can be made and substituted for those herein shown without departing from the nature and principle of our invention.

Having thus described our invention what we desire to claim and secured by Letters Patent is:

1. In a merchandising apparatus adapted to dispense vended articles in response to actuation by manual selection and operation, wherein the merchandising apparatus includes a plurality of magazines containing vendable articles which are dispensed by actuation of a dispensing control means associated with each magazine; an audible message announcing device capable of rendering a separate message appropriate to and associated with each vendable article upon actuation of the dispensing control means, said message announcing device comprising a sound producing mechanism, message retaining means associated with said sound producing mechanism and containing a separate message for each vendable article, selecting means operatively associated with said message, retaining means for selecting the proper message to be rendered by said sound producing mechanism upon actuation of a selected dispensing control means, and automatic control means operatively connected to said message retaining means, dispensing control means and selecting means for actuating said selecting means to select a proper message on said message retaining means and to render said message over said sound producing mechanism responsive to actuation of a selected dispensing control means.

2. A merchandising apparatus adapted to dispense any of a plurality of selected vendable articles in response to manual selection, said aparatus comprising a series of containers each of which contains a desired vendable article, a separate dispensing control means associated with each of said containers for dispensing the article in such container upon actuation thereof, a sound producing mechanism, operatively associated with said apparatus, message retaining means associated with said sound producing mechanism and containing a separate message for each vendable article, selecting means operatively associated with said message retaining means for selecting the proper message to be rendered by said sound producing mechanism upon actuation of a selected dispensing control means, and automatic control means operatively connected to said message retaining means, dispensing control means and selecting means for actuating said selecting means to select a proper message on said message retaining means and to render said message over said sound producing mechanism responsive to actuation of a selected dispensing control means.

3. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, an audible message announcing device operatively associated with said merchandising apparatus and being capable of rendering a separate message for each vendable article, said message announcing device including a message retaining means containing a separate message for each vending article, a sound producing mechanism operatively disposed within said message announcing device, selecting means operatively associated with said message retaining means and being operatively connected to said dispensing control means for selecting the proper message to be rendered by said sound producing mechanism upon actuation of a selected dispensing control means, and automatic control means operatively connected to said message retaining means, dispensing control means and selecting means for actuating said selecting means to select a proper message on said message retaining means and to render said message over said sound producing mechanism responsive to actuation of a dispensing control means.

4. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, announcing means operatively associated with said merchandising apparatus for rendering audible messages, a message retaining member associated with said announcing means and containing a plurality of separate messages, each one of which is associated with a particular container in said merchandising apparatus, indexing means operatively associated with said dispensing control means for selecting the proper message on said member, clamping means for holding the indexing means in the indexed position, time delay means interposed between the clamping means and indexing means for preventing actuation of the clamping means until the indexing means has been positioned for selection of the proper message and actuating means for energizing said announcing means to produce the message upon actuation of said dispensing control means.

5. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, announcing means operatively associated with said merchandising apparatus for rendering audible messages, a message retaining member associated with said announcing means and containing a plurality of separate messages, each one of which is associated with a particular container in said merchandising apparatus, indexing means operatively associated with said dispensing control means for selecting the proper message on said member, clamping means including a pair of clamping elements spaced on opposite sides of said indexing means for holding said indexing means in the indexed position, solenoid actuable means for shifting one of said clamping elements toward the other and engaging said indexing means for rigidly holding said indexing means between said clamping elements and actuating means for energizing said announcing means to produce the message upon actuating of said dispensing control means.

6. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, announcing means operatively associated with said merchandising apparatus for producing audible messages, said last named means including a message retaining member containing a plurality of separate messages, each one of which is associated with a particular container in said merchandising apparatus, indexing means operatively associated with said dispensing control means for selecting the proper message on said member, time delay means operatively associated with said indexing means to provide sufficient time for proper indexing of the correct message before actuation of said announcing means, and actuating means for energizing said announcing means to produce the message upon actuation of said dispensing control means.

7. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, announcing means operatively associated with said merchandising apparatus for producing audible messages, said last named means including a message retaining member containing a plurality of separate messages, eaech one of which is associated with a particular container in said merchandising apparatus, indexing means operatively associated with said dispensing control means for selecting the proper message on said member, actuating means for energizing said announcing means to produce the message upon actuation of said dispensing control means, and means for resetting said indexing means and said actuating means after the message has been rendered.

8. In a mechandise dispensing apparatus adapted to dispense vended articles in response to manual selection, wherein the apparatus includes a plurality of containers of vendable articles and a separate dispensing control means associated with each container for dispensing the vendable article upon actuation thereof; an audible message rendering device capable of rendering an audible message associated with each vended article, said device comprising announcing means for producing audible messages, said last named means including a message retaining member containing a plurality of separate messages, first relay means operatively connected to said dispensing control means for energizing said dispensing control means and permitting operation thereof when a proper amount of money has been deposited in said merchandising dispensing apparatus each one of which is associated with a particular container in said merchandising apparatus, indexing means operatively associated with said dispensing control means for selecting the proper message on said member, and actuating means including a second relay means and causing energizing of said actuating means for energizing said announcing means to produce the message upon actuation of said dispensing control means.

9. In a merchandise dispensing apparatus adapted to dispense vendable articles in response to manual selection, wherein the apparatus includes a plurality of containers of vendable articles and a separate dispensing control means associated with each container for dispensing the vendable article upon actuation thereof; an audible message rendering device capable of rendering an audible message associated with each vendable article, said device comprising announcing means for producing audible messages, said last named means including a message retaining member containing a plurality of separate messages, each one of which is associated with a particular container in said merchandising apparatus, indexing means operatively associated with said dispensing control means for selecting the proper message on said member, actuating means for energizing said announcing means to produce the message upon actuation of said dispensing control means, and means for resetting said indexing means and said actuating means after the message has been rendered.

10. In a merchandise dispensing apparatus adapted to dispense vendable articles in response to manual selection, wherein the apparatus includes a plurality of containers of vendable articles and a separate dispensing control means associated with each container for dispensing the vendable article upon actuation thereof; an audible message rendering device capable of rendering an audible message associated with each vendable article, said device comprising announcing means for producing audible messages, said last named means including a message retaining member containing a plurality of separate messages each one of which is associated with a particular container in said merchandising apparatus, indexing means operatively associated with said dispensing control means for selecting the proper message on said member, actuating means for energizing said announcing means to produce the message upon actuation of said dispensing control means, timing means operatively connected to said announcing means for regulating the duration of time that the message will be given, and means for resetting said indexing means and said actuating means after the message has been rendered.

11. In a merchandise dispensing apparatus adapted to dispense vendable articles in response to manual selection, wherein the apparatus includes a plurality of containers of vendable articles and a separate dispensing control means associated with each container for dispensing the vendable article upon actuation thereof; an audible message rendering device capable of rendering an audible message associated with each vendable article, said device comprising announcing means for producing audible messages, said last named means including a message retaining member containing a plurality of separate messages, each one of which is associated with a particular container in said merchandising apparatus, indexing means operatively associated with said dispensing control means for selecting the proper message on said member, said indexing means including a separate solenoid actuable element associated with each dispensing control means, actuating means for energizing said announcing means to produce the message upon actuation of said dispensing control means, timing means operatively connected to said announcing means for regulating the duration of time that the message will be given, and means for resetting said indexing means and said actuating means after the message has been rendered.

12. A merchandising apparatus adapted to dispense any of a plurality of selected vendable articles in response to manual selection, said apparatus comprising a series of containers each of which contains a desired vendable article, a separate dispensing control means associated with each of said containers for dispensing the article in such container upon actuation thereof, announcing means operatively associated with said merchandising apparatus for rendering audible messages, a message retaining member operatively associated with said announcing means and containing a plurality of separate messages, each one of which is associated with a particular container in said merchandising apparatus, indexing means operatively associated with said dispensing control means for selecting the proper message on said member, clamping means for holding the indexing means in the indexed position, first timing means for delaying the action of the clamping means until the indexing means has been positioned for selection of the proper message, actuating means for energizing said announcing means to produce the message upon actuation of said dispensing control means, second timing means operatively connected to said announcing means for regulating the duration of time that the message will be given, and third timing means for resetting the indexing means and actuating means at a proper time after the message has been rendered.

13. A merchandising apparatus adapted to dispense any of a plurality of selected vended articles in response to manual selection, said apparatus comprising a series of containers each of which contains a desired vended article, a separate dispensing control means associated with each of said containers for dispensing the article in such container upon actuation thereof, announcing means operatively associated with said merchandising apparatus for producing audible messages, said last named means including a message retaining member containing a plurality of separate messages, each one of which is associated with a particular container in said mechandising apparatus, indexing means operatively associated with said dispensing control means for selecting the proper message on said member, clamping means for holding said indexing means in the indexed position, first timing means operatively associated with said indexing means to provide sufficient time delay for proper indexing of the correct message before actuation of said clamping means and of said announcing means, first relay means operatively connected to said dispensing control means for energizing said dispensing control means and permitting operation thereof when a proper amount of money has been deposited in said merchandising apparatus, actuating means including a second relay means and causing energization of said actuating means for energizing said announcing means to produce the message upon actuation of said dispensing control means, second timing means operatively connected to said announcing means for regulating the duration of time that the message will be given, reset means for resetting said indexing means and said actuating means after the message has been rendered, and third timing means operatively connected to said reset means for providing the proper time of energization of said reset means.

References Cited by the Examiner

UNITED STATES PATENTS

| | | | |
|---|---|---|---|
| 944,608 | 12/1909 | Goodale | 274—11 |
| 1,787,644 | 1/1931 | Schermack | 221—3 |
| 1,876,424 | 9/1932 | Kenyon | 221—3 |
| 2,679,917 | 6/1954 | Andres | 194—15 |
| 3,097,670 | 7/1963 | Berman | 194—15 |
| 3,099,120 | 7/1963 | Brunn | 221—298 |
| 3,140,798 | 7/1964 | Dasher | 221—28 |
| 3,144,170 | 8/1964 | Peer | 221—298 |
| 3,154,308 | 10/1964 | Faulkner | 274—11 |
| 3,171,893 | 3/1965 | Burg | 194—15 |
| 3,176,815 | 4/1965 | Farinola | 221—3 |
| 3,186,588 | 6/1965 | Chapman | 221—3 |

RAPHAEL M. LUPO, *Primary Examiner.*

WALTER SOBIN, *Examiner.*